United States Patent
Badey

(10) Patent No.: US 8,264,119 B2
(45) Date of Patent: Sep. 11, 2012

(54) ROTOR FOR ROTARY ELECTRIC MACHINE COMPRISING MAGNET ELEMENT BETWEEN TWO ADJACENT TEETH

(75) Inventor: Jean-Philippe Badey, Estaples sur Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 415 days.

(21) Appl. No.: 12/095,541

(22) PCT Filed: Nov. 24, 2006

(86) PCT No.: PCT/FR2006/051225
§ 371 (c)(1),
(2), (4) Date: Dec. 16, 2010

(87) PCT Pub. No.: WO2007/077370
PCT Pub. Date: Jul. 12, 2007

(65) Prior Publication Data
US 2011/0095637 A1    Apr. 28, 2011

(30) Foreign Application Priority Data
Dec. 21, 2005  (FR) ...................................... 05 13028

(51) Int. Cl.
*H02K 1/22* (2006.01)
(52) U.S. Cl. ............... 310/263; 310/156.08; 310/156.31
(58) Field of Classification Search .................. 310/263, 310/156.66, 156.01–156.54
See application file for complete search history.

(56) References Cited

U.S. PATENT DOCUMENTS

| | | | |
|---|---|---|---|
| 5,306,977 A | 4/1994 | Hayashi | |
| 5,907,209 A | 5/1999 | Ishida | |
| 5,973,435 A * | 10/1999 | Irie et al. | 310/263 |
| 6,333,582 B1 | 12/2001 | Asao et al. | |
| 6,897,597 B1 * | 5/2005 | Armiroli et al. | 310/263 |
| 7,420,314 B2 * | 9/2008 | Fujita et al. | 310/263 |
| 7,868,513 B2 * | 1/2011 | Oowatari et al. | 310/263 |
| 2005/0184617 A1 * | 8/2005 | Fujita et al. | 310/263 |

FOREIGN PATENT DOCUMENTS
EP           1 117 168 A2    7/2001

* cited by examiner

*Primary Examiner* — Quyen Leung
*Assistant Examiner* — Leda Pham
(74) *Attorney, Agent, or Firm* — Berenato & White, LLC

(57) ABSTRACT

A rotor (10) for a rotary electric machine which comprises: two field spiders (12) each of which runs more or less radially with respect to the main axis of the rotor (10) and comprises a series of axial arms (20) in which each arm (20) runs axially inwards from the associated field spider (12), towards the other field spider (12) in such a way that each arm (20) of a field spider (12) lies in the space there is between two consecutive arms (20) of the other field spider (12); and at least one magnetic element (24) the main orientation of which is longitudinal position transversely between two adjacent arms (20) belonging one to each field spider (12) and which comprises at least one magnet (28), characterized in that the magnetic element (24) comprises at least one support shim (30) made of a non-magnetic material and mounted on a transverse end face of the magnet (28), and means of connecting the shim (30) to the magnet (28).

11 Claims, 3 Drawing Sheets

ROTOR FOR ROTARY ELECTRIC MACHINE COMPRISING MAGNET ELEMENT BETWEEN TWO ADJACENT TEETH

CROSS-REFERENCE TO RELATED APPLICATIONS AND CLAIM TO PRIORITY

This application relates to International Application No. PCT/FR2006/051225 filed Nov. 24, 2006 and French Patent Application No. 0513028 filed Dec. 21, 2005, of which the disclosures are incorporated herein by reference and to which priority is claimed.

The invention proposes a rotor for an electrical machine comprising at least one magnetic element arranged between two adjacent teeth and produced in several parts.

The invention proposes more particularly a rotor for a rotary electrical machine that has two magnet wheels, each of which extends roughly radially with respect to the principal axis of the rotor, and comprises a series of axial teeth, each tooth of which extends axially inwards from the associated magnet wheel in the direction of the other magnet wheel, so that each tooth on a magnet wheel is situated in the space existing between two consecutive teeth on the other magnet wheel, and at least one magnetic element with a longitudinal principal orientation that is arranged transversely between two adjacent teeth belonging respectively to each magnet wheel and that has at least one magnet.

According to a known embodiment, for example as described in the documents EP-A-0.762.617 and FR-A-2.784.248, the rotor comprises magnets arranged transversely between the axial teeth.

The main function of the magnets is to reduce leakages of magnetic flux at the space between two adjacent teeth, and to reinforce the magnetic flux by the creation of an inherent magnet flux. Thus the general magnetic properties of the rotor are partly determined by the magnets.

The number of magnets placed in a rotor is variable and depends on the characteristic sought for the rotary electrical machine. It is thus possible to produce machines having a different number of magnets.

Thus, when two series of rotors are produced between which only the number of magnets differs, the modifications to the installation assembling the rotors for the change in series could be too great to be profitable.

This is why it is generally preferred to produce rotors making it possible to keep the same number of magnets for all the rotor series. Consequently the rotors in some series have more magnets than necessary.

The magnetic flux produced by the magnets that are mounted on these rotors is then greater than that necessary, and the performance of the rotor is not optimised compared with its expected use.

The aim of the invention is to propose a rotor having a magnetic element mounted between two adjacent teeth and where the value of the magnetic flux created by this magnetic element is optimised for the required use of the electrical machine.

For this purpose, the invention proposes a rotor characterised in that the magnetic element comprises at least one support shim produced from a non-magnetic material that is mounted on a transverse end face of the magnet, and means of connecting the shim to the magnet.

According to other characteristics of the invention:
the magnetic element has two shims distributed transversely on each side of the magnet;
the magnetic element has two magnets distributed transversely on each side of the shim;
the magnetic element has an external shim that is mounted on the external radial end face of the magnet;
the dimensions of the magnet and the dimensions of the shim are determined according to the dimensions of the magnetic element and according to the global magnetic properties of the magnetic element;
the ratio between the width of the magnet and the width of the magnetic element is between 0.4 and 1;
the shim is connected to the magnet by means of a layer of adhesive arranged between the shim and the magnet;
the shim is connected to the magnet by the insert moulding of non-magnetic material around at least part of the magnet;
the shim is produced in one piece with the connecting means.

The lateral faces of the teeth of the magnet wheels advantageously each comprise a groove extending in the longitudinal direction of the lateral faces.

The magnet is for example at least partially produced from rare earth.

The shim can be solid so that no passage of air is formed between the magnet and the lateral face of the tooth of the magnet wheel.

In a variant, the shim can be arranged so as to form at least one passage of air between the magnet and the lateral face of the tooth in order to allow cooling of the magnet.

The shim can be produced at least partially from thermosetting or thermoplastic material.

In a variant, the shim is at least partially produced from aluminium.

Other characteristics and advantages of the invention will emerge from a reading of the following detailed description, for an understanding of which reference should be made to the accompanying figures, amongst which:

FIG. 1 depicts a rotor 10 of a rotary electrical machine that is mounted fixed to a central shaft (not shown) for rotation about the principal axis A of the rotor 10.

Figure 1:
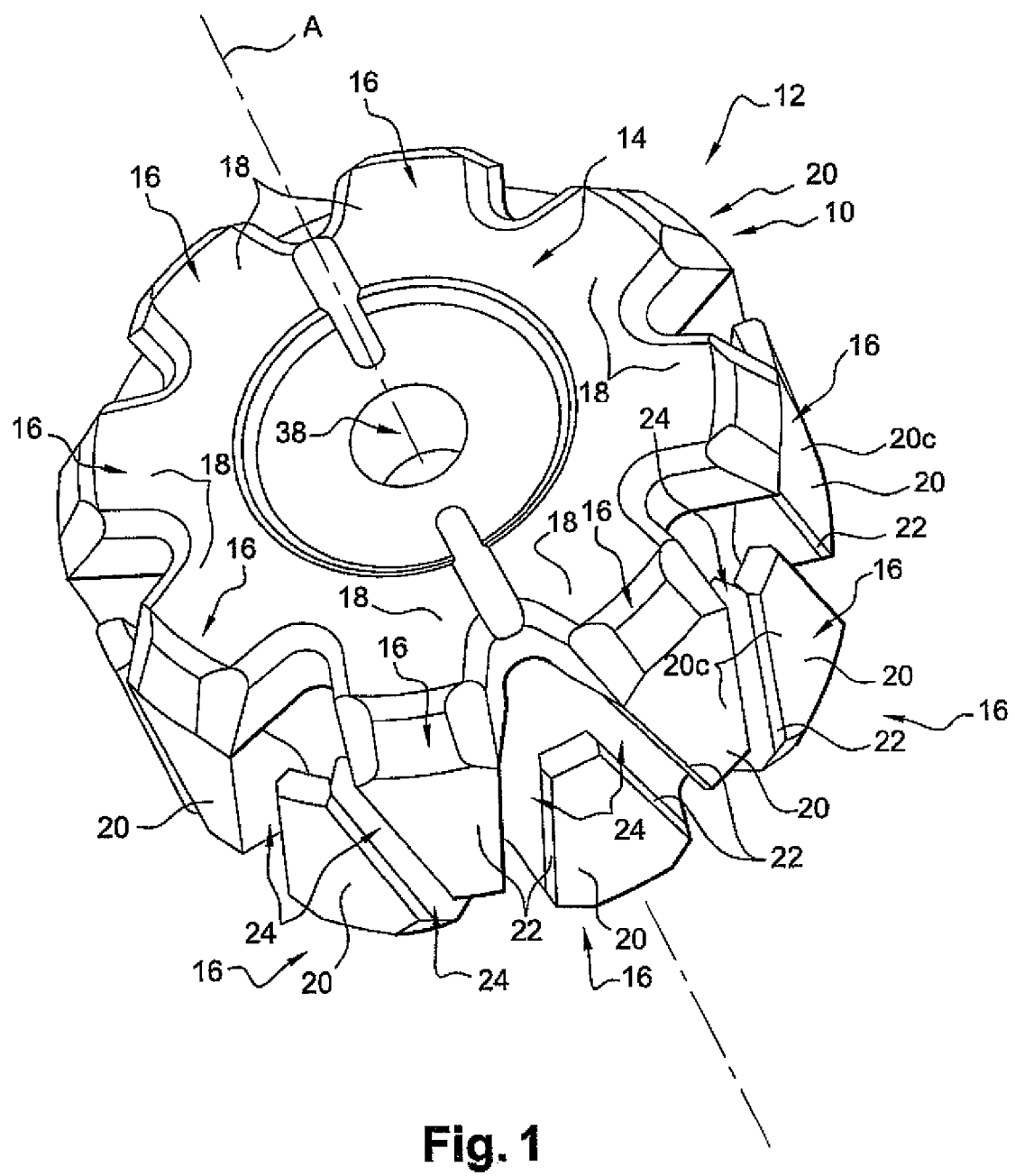
FIG. 1 is a schematic representation in perspective of a rotor comprising magnetic elements.

The rotor 10 is a claw rotor that comprises in particular two axially juxtaposed magnet wheels 12 each having an annular-shaped radial flange 14 provided at its external periphery with claws 16.

An excitation winding (not shown) is located axially between the flanges 14 of the magnet wheels 12.

Each claw 16 has a root portion 18 that is extended at its external periphery by a tooth 20 of roughly axial orientation.

An annual air gap exists between the external peripheral face 20e of the teeth 20 and the internal periphery of the body of the stator 16.

The teeth 20 are roughly trapezoidal in shape and are directed axially towards the flange 14 of the other magnet wheel 12, the tooth 20 on a magnet wheel 12 entering the space existing between two consecutive teeth 20 on the other magnet wheel 12, so that the teeth 20 on the magnet wheel 12 are interlocked.

In a manner known per se, each tooth 20 has two lateral faces 22, each of which extends parallel to and at a distance from an opposite lateral face 22 of an adjacent second tooth 20, belonging to the other magnet wheel 12.

Subsequently, a first tooth 20 belonging to a magnet wheel 12 and a second tooth 20 belonging to the other wheel 12, which each have a lateral face 22 opposite the lateral face 22 of the other tooth 20, will be designated as being two adjacent teeth 20.

Figure 2:
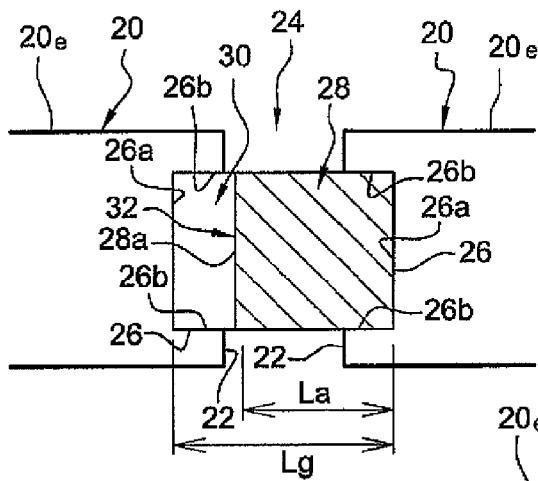
FIG. 2 is a view to a larger scale in section along a transverse radial plane of the rotor depicted in FIG. 1, showing the structure of the magnetic element.
Figure 3:
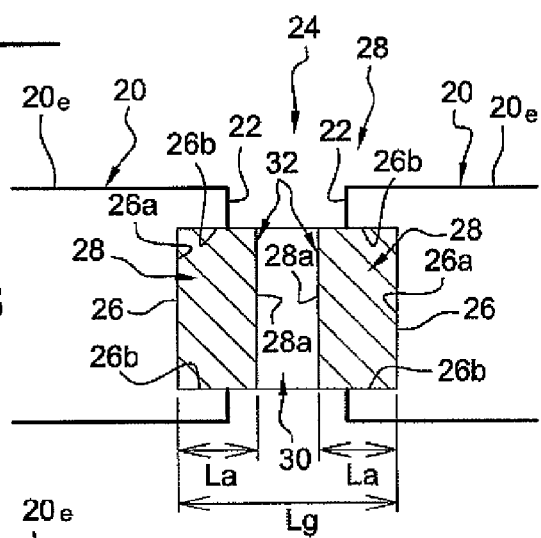
FIGS. 3 to 5 are views similar to that in FIG. 2, showing variant embodiments of the magnetic element.
Figure 4:
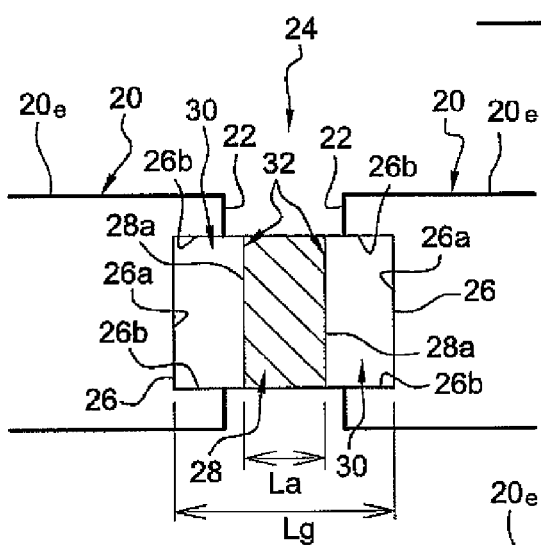

As can be seen in FIGS. 2 to 4, the rotor 10 comprises magnetic elements 24 interposed between two adjacent teeth 20, which reduce the leakages of magnetic flux at the space between two adjacent teeth 20 and which contribute to reinforcing the magnetic flux.

According to a preferred embodiment, the number of these magnetic elements 24 is determined so that it is less than the number of poles on the rotor 10 and their arrangement is symmetrical with respect to the axis of the rotor 10. For example four pairs of magnetic elements 28 for eight pairs of poles are provided.

In the following description, reference will be made to two adjacent teeth 20 and to the associated magnetic element 24 that is arranged between these two teeth 20. In addition, the orientations vertical and transverse will be adopted non-limitingly in accordance with the reference frame V, T indicated in FIGS. 2 to 5, for which the vertical orientation corresponds to the radial orientation with respect to the principal axis A of the rotor 10 passing through a mid-plane of the magnetic element 24 and the transverse orientation corresponds to the normal to the lateral face 22 of the two adjacent teeth 20, the longitudinal orientation corresponding to the principal axis of the magnetic element 24.

The teeth 20 being identical, it will be understood that this description applies identically to the other teeth 20.

As can be seen in more detail in FIG. 2 et seq, the opposite lateral faces 22 of the two teeth 20 each have a groove 26 or recess, which extends in the longitudinal direction of the lateral face 22.

The cross section of each groove 26 in a transverse vertical plane is in the form of a "U" open transversely towards the other groove 26, and the groove 26 has a vertical bottom 26a and two transverse wings 26b, which are here parallel.

The two grooves 26 on the two adjacent teeth 20 thus delimit a longitudinal housing in which the magnetic element 24 is housed.

In accordance with the invention, each magnetic element 24 is produced in several parts and comprises at least one permanent magnet 28, at least one support shim 30, and means of connecting the support shim 30 with the permanent magnet 28.

Each magnet 28 is produced in a conventional manner, by sintering magnetic powder or by machining a block of magnetic material.

Each support shim 30 is produced from a non-magnetic material that is defined so that the support shim 30 has no influence on the magnetic properties of the magnetic element 24. For example, the support shim 30 is produced from plastics material or aluminium.

Thus the shim 30 contributes to the creation of a supplementary air gap.

The shim 30 is mounted on a vertical transverse end face 28a opposite the magnet 28.

Subsequently to the assembly of the magnets 28 and shims 30 in order to form a magnetic element 24, the magnetic element 24 is then placed in a magnetic field so as to magnetise the magnetic element 24.

Here the magnetic element 24 is roughly parallelepipedal in shape as well as the magnet 28 and the shim 30.

According to a first embodiment of the invention depicted in FIG. 2, the magnetic element 24 has a single magnet 28 and a single shim 30, which are each arranged at a transverse end of the magnetic element 24. In addition the magnet 28 and shim 30 are each received in an associated groove 26.

FIG. 3 depicts a second embodiment of the invention according to which the magnetic element 24 has two magnets 28 and a single shim 30. In addition, the two magnets 28 are arranged transversely on each side of the shim 30 and each magnet 28 is received in an associated groove 26.

FIG. 4 depicts a third embodiment of the invention according to which the magnetic element 24 comprises two shims 30 and a single magnet 28. In addition the two shims 30 are arranged transversely on each side of the magnet 28 and each shim 30 is received in an associated groove 26.

The production of the magnetic element 24 from two elements having different magnetic properties makes it possible to adjust the global magnetic flux created by the magnetic elements 24.

This is because the global magnetic flux created by the magnetic elements 24 corresponds to the sum of the magnetic fluxes created by each magnetic element.

The magnetic flux created by each magnetic element is equal to the product of the density of the operating flux "B" of the magnetic element and the facing surface "S" between the magnet of the magnetic element and the surface of the claw.

Figure 7:
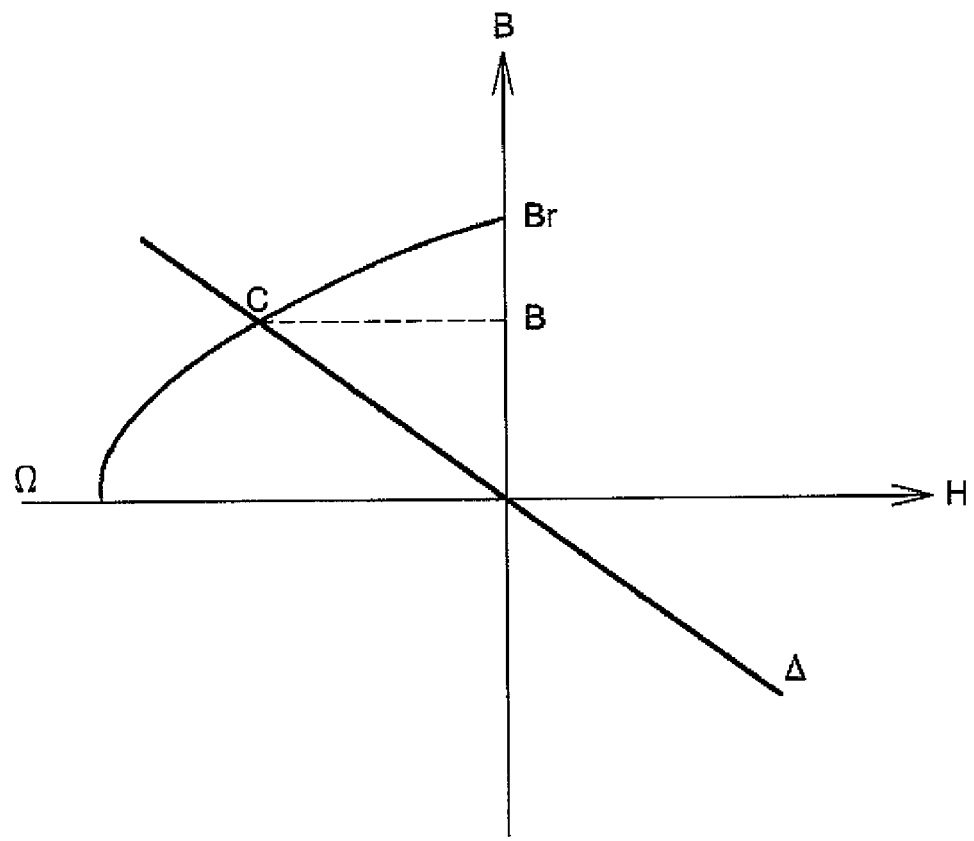
FIG. 7 depicts the magnetic characteristic of the magnet belonging to the magnetic element.

"B" is determined from the magnetisation curve in FIG. 7 and corresponds to the ordinate of the point of contact C between the magnetic characteristic of the magnet 8 (curve Ω) and the straight line Δ whose slope is in particular related to the air gaps of the principal path over which the flux passes and the width "La" of the magnet 28.

The air gaps comprise, for example, the space situated between the external peripheral face 20e of the teeth 20 and the internal periphery of the body of the stator 16.

"Br" corresponds to the density of the remnant flux when the magnetic field H is zero.

Thus, the greater the transverse dimension "La" of each magnet 28, the more the straight line Δ tends towards the Y-axis. The operating magnetic density "B" of the magnet then tends towards "Br" and the magnetic flux created by the magnetic element 24 is increased.

Thus, according to the invention, the dimensions of the magnet 28 or of the two magnets 28 forming the magnetic element 24 are determined according to the value of the magnetic flux that it is wished to obtain.

The dimensions of the magnetic element 24, principally its transverse width "Lg", are determined according to the dimensions of the two grooves 26, so that the transverse width "Lg" of the magnetic element is substantially equal to the distance between the bottoms 26a of the two grooves 26.

Thus the dimensions of each shim 30 are then determined according to the dimensions of each magnet 26, so as to adjust the dimensions of the magnetic element 24 to the dimensions of the housing defined by the two facing grooves.

Figure 6:
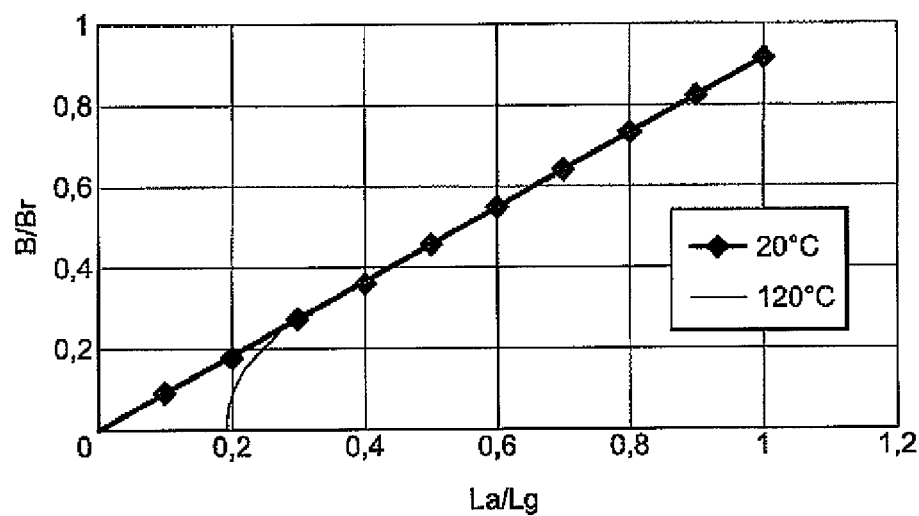
FIG. 6 depicts the change in the ratio "B/Br" as a function of the ratio "La/Lg" at 20° C. and 120° C.

FIG. 6 depicts the variation in the ratio "B/Br" as a function of the ratio "La/Lg".

As already stated above, "B" represents the density of the operating flux of the magnetic element 24, "Br" represents the density of the remnant flux, "La" represents the width of the magnet 28 in the magnetic element 24, "Lg" represents the transverse width of the magnetic element 24.

The density of the remnant flux corresponds to the density of the permanent flux remaining in the magnet at the end of the magnetisation phase.

By means of the curve in FIG. 6, it is possible to deduce the width "La" of the magnet 28 according to the magnetic properties sought of the magnetic element 24, that is to say according to the density of the operating flux sought.

The change in the ratio "B/Br" as a function of the ratio "La/Lg" is different according to the temperature to which the magnetic element 24 is subjected.

Thus, at T1, around 20°, the characteristic of the curve is linear. At T2, around 120° C., the curve is initially non-linear when the ratio La/Lg is small and then becomes linear thereafter. This is because the characteristic of the magnet belonging to the magnetic element degrades when the temperature increases. This degradation is accentuated when the ratio La/Lg is small.

However, during the functioning of the machine, the temperature of the magnet is around T2. Thus, by working in the linear part of the curve of T2, it is possible to adapt the density of the operating flux according to the width "La" of the magnetised part.

The density of the minimum operating flux "B" is fixed by the linear operating limit of the magnet at the temperature T2.

Thus, with regard to the curve of T2, it is necessary to work in the part of the curve such that the ratio "La/Lg" is greater than 0.4. Total demagnetisation of the magnet 28 is thus avoided.

Through the curve of T2 it is possible more easily to determine the dimensions of the magnet 28 as a function of the density of the operating flux "B" desired and according to the distance "Lg" available between the two groups 26.

It will be understood that, when the magnetic element 24 comprises several magnets 28, such for example in the embodiment depicted in FIG. 3, the width "La" of the magnet 28 that is determined according to the embodiments described above corresponds to the sum of the widths of all the magnets 28 of the magnetic element 24.

In general terms, the use of the magnetic element 24 is particularly advantageous when it is wished to mount an element between two adjacent teeth 24 where the value of the density of the operating flux is less than the value of the density of the operating flux of a solid magnet mounted between the two teeth.

The use of at least one shim 30 then makes it possible to adapt the dimensions of the magnetic element 24 to the dimensions of the grooves 26.

The shim 30 being produced from a non-magnetic material, it contributes to the creation of a supplementary air gap.

In addition, the use of a shim 30 in the magnetic element 24 also makes it possible to add certain mechanical properties to the mechanical element 24 compared with a solid magnet.

This is because, whatever its method of production, a magnet 24 is a relatively fragile element. On the other hand, the shim 30 is produced from an elastically deformable material.

Consequently the use of a shim 30 made from deformable material for producing the magnetic element 24 makes it possible to compensate for certain dimensional tolerances in the rotor 10 resulting for example from a radial offset of two grooves 26, that is to say a defect in transverse alignment, or a variation in the distance between the bottoms 26a of the two grooves 26.

According to the embodiments of the invention depicted in FIGS. 2 to 5, the support shim 30 is connected to each magnet 28 by means of a layer of adhesive 32.

The layer of adhesive 32 that connects the shim 30 to the magnet 28 is also produced from a non-magnetic material. In addition, according to a preferred aspect of these embodiments, the layer of adhesive 32 is relatively flexible, so that it also enables the magnetic element 24 to provide an adaptation of the shape of the magnetic element 24 to any dimensional tolerances in the rotor 10.

According to a variant embodiment, not shown, of the means of connecting the shim 30 with the magnet 28, a non-magnetic material is moulded around the magnet 28 and around the shim 30.

According to the preferred embodiment of this variant, the shim 30 is produced in one piece with the connecting means, that is to say to say the shim 30 is produced at least partly by moulding non-magnetic material around the magnet 28.

When the electrical machine comprising the rotor 10 is in operation, the rotor 10 turns around its axis at a high speed.

Consequently, since the teeth 16 of the rotor 10, and consequently the magnetic elements 24, are arranged at the external radial ends of the flanges 14, each magnetic element 24 is subjected to a high centrifugal force during the rotation of the rotor 10.

Figure 5:
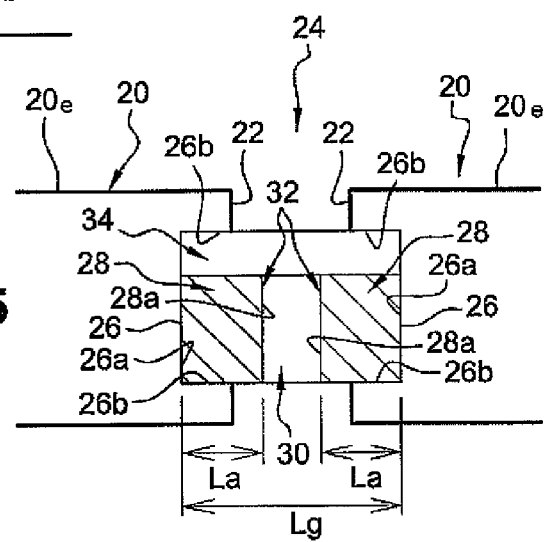

FIG. 5 depicts a variant embodiment of the invention according to which the magnetic element 24 comprises an external shim 34 that extends transversely over the entire width "Lg" of the magnetic element 24 and that is in abutment vertically upwards against the top transverse wing 26b of each groove 26.

Thus the external shim is arranged radially between each magnet 28 and the top transverse wings 26b of the grooves 26.

When the rotor 10 rotates, each magnet bears against the external shim 34, which then damps the compression forces of the magnet 28 resulting from the centrifugal force and any deformations of the magnet wheel 12.

The magnetic element 24 is able to be mounted on a conventional rotor 10, in replacement for a solid magnet. In addition, mounting the magnetic element 24 on a rotor requires no modification to the installations assembling the rotor 10, which consequently gives rise to no increase in the cost of producing the rotary electrical machine.

The rotor that has just been described comprises magnetic elements 24 that are parallelepipedal-shaped. It will be understood that the invention is not limited to this embodiment and that the magnetic elements 24 can have a different shape, for example they may have a transverse section in the shape of a diamond.

The invention claimed is:

1. A rotor (10) for a rotary electrical machine, the rotor comprising:
   two magnet wheels (12), each of which extends roughly radially with respect to the principal axis of the rotor (10), and comprises a series of axial teeth (20), each tooth (20) of which extends axially inwards from the associated magnet wheel, in the direction of the other magnet wheel (12), so that each tooth (20) on a magnet wheel (12) is situated in the space existing between two consecutive teeth (20) on the other magnet wheel (12); and
   at least one magnetic element (24) with a longitudinal principle orientation that is arranged transversely between two adjacent teeth (20) belonging respectively to each magnet wheel (12);
   each of opposite lateral faces (22) of the two adjacent teeth (20) having a groove (26) with a bottom (26a) extending in the longitudinal direction of the lateral face (22) so that the two grooves (26) on the two adjacent teeth (20) delimit a housing in which the magnetic element (24) is housed and so that a transverse width (Lg) of the magnetic element (24) being substantially equal to the distance between the bottoms (26a) of the two opposite grooves (26);
   the magnetic element (24) comprising at least one magnet (28), at least one support shim (30) produced from a non-magnetic material and mounted on a transverse end face of the magnet (28), and means for connecting the support shim to the magnet;

the support shim (30) being received in an associated groove (26);

the ratio between a width of the magnet (28) and the transverse width (Lg) of the magnetic element (24) is between 0.4 and 1.

2. The rotor (10) according to claim 1, wherein the magnetic element (24) has two support shims (30) distributed transversely on each side of the magnet (28) and wherein each of the support shims (30) is received in an associated groove (26).

3. The rotor (10) according to claim 1, wherein the magnetic element (24) has an external shim (34) that is mounted on an external radial end face of the magnet (28).

4. The rotor (10) according to claim 1, wherein dimensions of the magnet (28) and dimensions of the support shim (30) are determined according to the transverse width (Lg) of the magnetic element (24) and according to the global magnetic properties of the magnetic element (24).

5. The rotor (10) according to claim 1, wherein the shim (30) is connected to the magnet by means of a layer of adhesive (32) arranged between the shim (30) and the magnet (28).

6. The rotor (10) according to claim 1, wherein the shim (30) is connected to the magnet (28) by the insert moulding of non-magnetic material around at least part of the magnet (28).

7. The rotor (10) according to claim 6, wherein the shim (30) is produced in one piece with the connecting means.

8. The rotor according to claim 1, wherein the magnet is at least partially produced from rare earth.

9. The rotor according to claim 1, wherein the shim is solid so that no passage of air is formed between the magnet and the lateral (22) face of the magnet wheel.

10. The rotor according to claim 1, wherein the shim can be produced at least partially from thermosetting or thermoplastic material.

11. The rotor according to claim 1, wherein the shim is at least partially produced from aluminum.

* * * * *